United States Patent [19]
Nakashima

[11] Patent Number: 5,683,776
[45] Date of Patent: Nov. 4, 1997

[54] COMPOSITE FILM FOR COLOR COPYING

[75] Inventor: Shin Nakashima, Nara, Japan

[73] Assignee: Kikokaseisangyou Co., Ltd., Osaka, Japan

[21] Appl. No.: 708,964

[22] Filed: Sep. 6, 1996

[51] Int. Cl.[6] .................. B32B 7/10; B32B 19/04
[52] U.S. Cl. .................. 428/40.2; 428/41.7; 428/331
[58] Field of Search .................. 428/40.2, 41.7, 428/331

[56] References Cited

U.S. PATENT DOCUMENTS

| | | | |
|---|---|---|---|
| 4,633,276 | 12/1986 | Shibata | 346/200 |
| 4,898,849 | 2/1990 | Kang | 503/214 |
| 5,158,853 | 10/1992 | Sasaki | 430/124 |
| 5,229,188 | 7/1993 | Takeuchi | 428/195 |
| 5,260,256 | 11/1993 | Takahara | 503/227 |
| 5,374,475 | 12/1994 | Walchli | 428/304.4 |
| 5,572,291 | 11/1996 | Moriguchi | 399/390 |
| 5,593,241 | 1/1997 | Kawaguchi | 400/613 |

Primary Examiner—Jenna Davis
Attorney, Agent, or Firm—Wenderoth, Lind & Ponack

[57] ABSTRACT

Disclosed is a composite film for color copying. The film comprises a printing synthetic resin film with a silica-containing synthetic resin paint coating its front surface. An anti-static agent coats the synthetic resin paint. An adhesive coating is provided on the back surface of the printing film. A base synthetic resin film with a release agent coating its front surface is provided with the release agent layer contacting the adhesive coating on the printing film such that the printing film and the base film are releasably adhered. A silica-containing synthetic resin paint is coated on the back surface of the base film. An anti-static agent is provided on the synthetic resin paint. The synthetic resin paint and anti-static agent coatings on both the printing film and the base film provide the surfaces with a surface resistivity within the range from $1 \times 10^8$ to $1 \times 10^{13}$ ohms, when the surface resistivity is measured at a temperature between 10° C. and 28° C. and the humidity is between 24% and 70%. The surface resistivity of the coated printing film may be less than the surface resistivity of the coated base film.

1 Claim, 1 Drawing Sheet

COMPOSITE FILM FOR COLOR COPYING

TECHNICAL FIELD

This invention relates to composite films for color copying which comprise synthetic resin films.

PRIOR ART

Formerly, composite films for color copying comprised a printing synthetic resin film and a base synthetic resin film, and the printing synthetic resin film was releasably affixed to the base synthetic resin film. Quality of colored images reproduced on the printing synthetic resin film by means of dry electronic color copying machines was influenced by the temperature and the humidity of the atmosphere in environments in which color copying was carried out. Since the front surface and the back surface of the composite films were made of insulating material, it was necessary for the front surface and the back surface of the composite films to be coated with anti-static agents in order to prevent static electricity from being generated and in order to prevent the composite films from being blocked up in the copying machines.

However, even if the composite films were coated with the anti-static agents, light and shade of colored images were frequently occurred and the images became blurred or disordered. Also, flares came out around the images.

SUMMARY OF THE INVENTION

The inventor has made a profound study of composite films for color copying, and he has found a composite film according to the invention, which does not have such defects as mentioned above.

An object of the present invention is to provide a composite film for color copying which is capable of reproducing colored images clearly on the printing film without blocking and trouble of composite films sent out as two or more than two being superimposed in spite of the front surface and the back surface of the composite film being made of insulating material, and which is capable of being used in color copying machines which are equiped with a laser printer.

In accordance with the foregoing object, this invention provides a composite film for color copying comprising a printing synthetic resin film having a front surface and a back surface, a synthetic resin paint coating the front surface of the printing film, said synthetic resin paint including particles of silica, an anti-static agent coating the synthetic resin paint, an adhesive coating the back surface of the printing film, a base synthetic resin film having a front surface and a back surface, a release agent coating the front surface of the base film and contacting the adhesive releasably adhering the printing film to the base film, a synthetic resin paint coating the back surface of the base film, said synthetic resins including particles of silica and an anti-static agent coating the synthetic resin paint, said composite film characterized in that the front surface of the printing film and the back surface of the base film are coated with respective synthetic resin paint and anti-static agents so that surface resistivity of the front surface of the printing film and surface resistivity of the back surface of the base film may be within the range from $1\times10^8$ to $1\times10^{13}$ ohms, when the surface resistivity is measured in environments the temperature of which ranges between 10° C. and 28° C. and the moisture of which ranges between 24% and 70%, and so that the former surface resistivity may be less than the latter surface resistivity.

As to the surface resistivity, if the surface resistivity is less than $1\times10^8$ ohms, images reproduced on the printing film partially disappear or turn white. If the surface resistivity is more than $1\times10^{13}$ ohms, flares come out around the images.

As to the environments, condition of the environments is indicated by the temperature and the humidity of the atmosphere in which color copying is carried out with the composite film according to the invention.

As to the anti-static agent, it is possible for all of well-known anti-static agents to be used in the invention.

Particles of cilica to be fixed on the front surface of the printing film mainly aim at fixing toner, while particles of silica to be fixed on the back surface of the base film mainly aim at preventing composite films from being sent out as two or more composite films being superimposed. The particles preferably are 10 to 20 microns in diameter.

When particles of silica are included in the synthetic resin paint coating the front surface of the printing film or the back surface of the base film, surface resistivity of respective synthetic resin paints increases or decreases according to the volume of the particles of silica. It is necessary for quantity of the anti-static agent to be increased as compared with a case of particles of silica being not included.

As to the synthetic resin paint for fixing the particles of silica, polyolefin, acrylic, polyester or urethane synthetic resin paint is used, and it is applied in a thickness of 10 to 50 microns.

As to the adhesive, it is possible for well-known adhesives to be used, and they are applied in a thickness of 10 to 30 microns.

As to the release agent, it is possible for well-known release agents to be used, and they are applied in a thickness of 1 to 2 microns.

EXAMPLE

Figure 1:
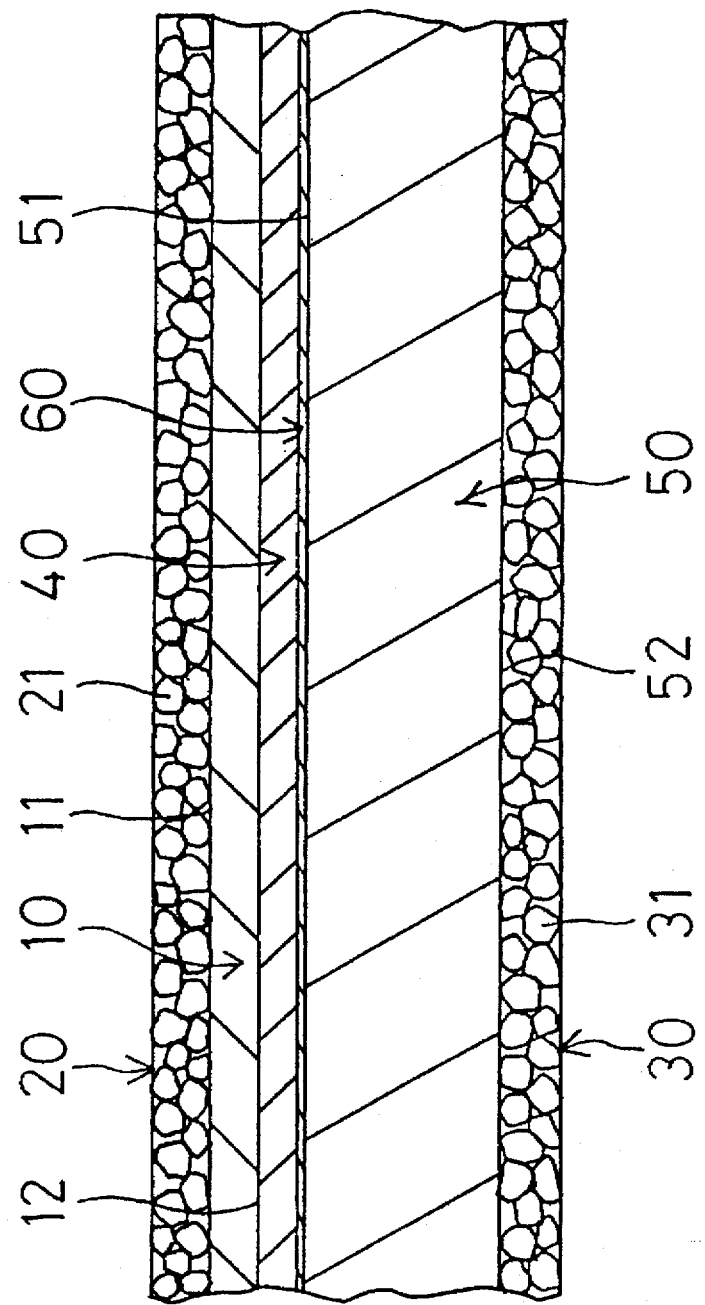
FIG. 1 is an enlarged fragmentary section view of an example of the composite film for color copying according to the invention.

A preferred embodiment of the composite film of the invention is described in further detail with reference to FIG. 1.

To prepare a synthetic resin paint for front surface, toluene of 1 kg, particles of silica of 50 g which were 10 to 20 microns in diameter and polyolefine synthetic resin were mixed.

To prepare an anti-static agent for front surface, an interface active agent, namely, polyoxyethylene-group added chained quaternary ammonium salt, $[RCONH(CH_2)_3N(CH_3)_2N(CH_3)_2CH_2CH_2OH]^+NO_3^-$ of 20 g and an organic solvent of 1 kg were mixed.

Then, the front surface (11) of a polyester film (10) having a thickness of 25 microns was coated with the synthetic resin paint, and it was further coated with the anti-static agent. The synthetic resin paint and the anti-static agent were indicated by (20), and the particles of silica was illustrated as (21). The back surface (12) of the polyester film (10) was coated with acrylic synthetic adhesive which was indicated by (40).

To prepare a synthetic resin paint for back surface, toluene of 1 kg, particles of silica of 75 g which were 10 to 20 microns in diameter and polyolefine synthetic resin were mixed.

To prepare an anti-static agent for back surface the foregoing interface active agent of 10 g was added to the same organic solvent of 1 kg.

Then, the front surface (51) of another polyester film (50) having a thickness of 100 microns was coated with silicone which was about 1 micron in thickness, and which was indicated by (60). The back surface (52) of the polyester film (50) was coated with the synthetic resin paint, and it was further coated with the anti-static agent. The synthetic resin paint and the anti-static agent were indicated by (30), and the particles of silica were illustrated as (31).

Subsequently, the adhesive (40) of the polyester film (10) was affixed to the silicone (60) of the polyester film (50) to obtain a composite film for color copying according to the present invention, and then, plural composite films were produced.

With the composite film according to the invention, color copying was carried out in respective environments A (wherein the temperature is 17° C. and the humidity is 40%), B (wherein the temperature is 22° C. and the humidity is 35%), C (wherein the temperature is 24° C. and the humidity is 38%) and D (wherein the temperature 26%° C. and the humidity is 56%). Quality of colored images reproduced on each composite film was examined. The images were perfectly printed and were not blurred. The images were distinct and were not disordered.

Surface resistivity of the front surface of the printing film which was coated with the synthetic resin paint and the anti-static agent and surface resistivity of the back surface of the base film which was coated with the synthetic resin paint and the anti-static agent were measured respectively.

Results of measurement of the surface resistivity were shown in Table 1.

TABLE 1

| ENVIRONMENT | SURFACE RESISTIVITY (ohms) | |
|---|---|---|
| | front surface | back surface |
| A | $6.5 \times 10^{10}$ | $2.0 \times 10^{11}$ |
| B | $3.8 \times 10^{10}$ | $4.5 \times 10^{11}$ |
| C | $2.7 \times 10^{10}$ | $5.4 \times 10^{11}$ |
| D | $8.3 \times 10^{10}$ | $6.8 \times 10^{11}$ |

COMPARATIVE EXAMPLE

To prepare a synthetic resin paint for front surface, toluene of 1 kg, particles of silica of 75 g which were 10 to 20 microns in diameter and polyolefine synthetic resin were mixed.

To prepare an anti-static agent for front furface, an interface active agent, namely, polyoxyethylene-group added chained quaternary ammonium salt of 10 g and an organic solvent of 1 kg were mixed.

Then, the front surface of a polyester film having a thickness of 25 microns was coated with the synthetic resin paint, and it was further coated with the anti-static agent.

The back furface of the polyester film was coated with acrylic synthetic adhesive.

To prepare a synthetic resin paint for back surface, toluene of 1 kg, particles of silica of 75 g which were 10 to 20 microns in diameter and polyolefine synthetic resin were mixed.

To prepare an anti-static agent for back surface, the foregoing interface active agent of 20 g and an organic solvent of 1 kg were mixed.

Then, the front surface of another polyester film having a thickness of 100 microns was coated with silicone which was about 1 micron in thickness. While, the back surface of the polyester film was coated with the synthetic resin paint, and it was further coated with tha anti-static agent.

Subsequently, the adhesive of the polyester film having a thickness of 25 microns was affixed to the silicone of the polyester film having a thickness of 100 microns to obtain a composite film for comparison, and then plural composite films for comparison were produced.

With the composite film for comparison, color copying was carried out in respective environments, and quality of colored images reproduced on the composite film for comparison was examined. The images were blurred and disordered.

Surface resistivity of the front and back surfaces of the composite film for comparison was measured in respective environments A, B, C and D. Results of mesurement of the surface resistivity were shown in Table 2.

TABLE 2

| ENVIRONMENT | SURFACE RESISTIVITY (ohms) | |
|---|---|---|
| | front surface | back surface |
| A | $2.3 \times 10^{10}$ | $6.3 \times 10^{11}$ |
| B | $5.2 \times 10^{10}$ | $1.6 \times 10^{11}$ |
| C | $7.4 \times 10^{10}$ | $4.5 \times 10^{11}$ |
| D | $8.5 \times 10^{10}$ | $3.0 \times 10^{11}$ |

EFFECT OF THE INVENTION

Since the composite film for color copying according to the invention comprises a printing synthetic resin film and a base synthetic resin film, and since the front surface of the printing film and the back surface of the base film are coated with a synthetic resin paint and an anti-static agent so that surface resistivity of the front surface and surface resitivity of the back surface may be within the range from $1 \times 10^8$ to $1 \times 10^{13}$ ohms, when measured in environments the temperature of which ranges from 10° C. to 28° C. and the moisture of which ranges from 25% to 70% and so that the former surface resistivity may be less than the latter surface resistivity, the composite film according to the invention can always reproduce colored images clearly. The colored images are distict and not disordered.

Also, the composite film for color copying according to the invention is suitably used in color copying machines which are equiped with a laser printer and which are dissectible at high speed.

I claim:

1. A composite film for color copying comprising a printing synthetic resin film having a front surface and a back surface, a synthetic resin paint coating the front surface of the printing film, said synthetic resin paint including particles of silica, an anti-static agent coating the synthetic resin paint, an adhesive coating the back surface of the printing film, a base synthetic resin film having a front surface and a back surface, a release agent coating the front surface of the base film and contacting the adhesive releasably adhering the printing film to the base film, a synthetic resin paint coating the back surface of the base film, said synthetic resin paint including particles of silica and an anti-static agent coating the synthetic resin paint, said composite film for color copying characterized in that the front surface of the printing film and the back surface of the base film are coated with respective synthetic resin paints and anti-static agents so that surface resistivity of the front surface of the printing film and surface resistivity of the back surface of the base film may be within the range from $1 \times 10^8$ to $1 \times 10^{13}$ ohms, when measured in environments the temperature of which ranges between 10° C. and 28° C. and the moisture of which ranges between 24% and 70%, and so that the former surface resistivity may be less than the latter surface resistivity.

* * * * *